US009031768B2

(12) United States Patent
Lagerlöf et al.

(10) Patent No.: US 9,031,768 B2
(45) Date of Patent: May 12, 2015

(54) METHOD FOR FUNCTIONAL DIAGNOSIS OF A SEPARATOR

(75) Inventors: Fredrik Lagerlöf, Stenkullen (SE); Flemming Jeppesen, Göteborg (SE)

(73) Assignee: Volvo Lastvagnar AB, Göteborg (SE)

( * ) Notice: Subject to any disclaimer, the term of this patent is extended or adjusted under 35 U.S.C. 154(b) by 934 days.

(21) Appl. No.: 12/933,339

(22) PCT Filed: Mar. 18, 2008

(86) PCT No.: PCT/SE2008/000203
§ 371 (c)(1),
(2), (4) Date: Sep. 20, 2010

(87) PCT Pub. No.: WO2009/116897
PCT Pub. Date: Sep. 24, 2009

(65) Prior Publication Data
US 2011/0011380 A1 Jan. 20, 2011

(51) Int. Cl.
*B01D 45/14* (2006.01)
*F01M 11/10* (2006.01)
*F01M 13/04* (2006.01)

(52) U.S. Cl.
CPC ........ *B01D 45/14* (2013.01); *F01M 2013/0427* (2013.01); *F01M 11/10* (2013.01); *F01M 13/04* (2013.01); *F01M 2013/0422* (2013.01)

(58) Field of Classification Search
CPC ....... B01D 45/14; F01M 11/10; F01M 13/04; F01M 2013/0422; F01M 2013/0427
USPC .................. 123/572–574; 73/114.55, 114.56, 73/114.57
See application file for complete search history.

(56) References Cited

U.S. PATENT DOCUMENTS 5,329,913 A 7/1994 Suzuki et al.
5,697,349 A * 12/1997 Blum ............................ 123/572

(Continued)

FOREIGN PATENT DOCUMENTS

DE 10026492 A1 11/2001
DE 20302824 U1 7/2004

(Continued)

OTHER PUBLICATIONS

International Search Report for corresponding International Application PCT/SE2008/000203.

(Continued)

*Primary Examiner* — Hieu T Vo
*Assistant Examiner* — Sherman Manley
(74) *Attorney, Agent, or Firm* — WRB-IP LLP

(57) ABSTRACT

A method for functional diagnosis of a separator for separating oil present in a blow-by has from a crankcase in a combustion engine is provided. The crankcase includes a crankcase pressure sensor, and is in fluid communication with the separator. The method includes the steps of detecting a first output signal of the crankcase pressure sensor at a first operational point or interval, and comparing the first output signal of the crankcase pressure sensor with at least one reference value or signal, wherein the comparison between said first output signal of the crankcase pressure sensor and the at least one reference value or signal provides the functional diagnosis of the separator. A method can perform a functional diagnosis without the use of additional sensors or complex algorithms and as a consequence manufacturing costs can be held at a minimum.

20 Claims, 8 Drawing Sheets

(56) References Cited

U.S. PATENT DOCUMENTS

| | | | |
|---|---|---|---|
| 6,152,120 A * | 11/2000 | Julazadeh | 123/572 |
| 6,691,687 B1 | 2/2004 | Liang et al. | |
| 6,709,477 B1 * | 3/2004 | Håkansson et al. | 55/401 |
| 6,779,388 B2 * | 8/2004 | Baeuerle et al. | 73/114.31 |
| 7,080,547 B2 * | 7/2006 | Beyer et al. | 73/114.37 |
| 7,465,341 B2 * | 12/2008 | Eliasson | 96/281 |
| 7,484,480 B1 * | 2/2009 | Fornof et al. | 123/41.86 |
| 2001/0047801 A1 * | 12/2001 | Baeuerle et al. | 123/574 |
| 2003/0233932 A1 | 12/2003 | Ekeroth | |
| 2006/0243258 A1 | 11/2006 | Withrow et al. | |
| 2012/0174546 A1 * | 7/2012 | Tornblom et al. | 55/461 |
| 2012/0174547 A1 * | 7/2012 | Tornblom et al. | 55/461 |
| 2013/0233290 A1 * | 9/2013 | Skoog | 123/572 |

FOREIGN PATENT DOCUMENTS

| | | |
|---|---|---|
| JP | H0351121 U | 5/1991 |
| WO | 9956882 A1 | 11/1999 |
| WO | 9956883 A1 | 11/1999 |
| WO | 0100969 A1 | 1/2001 |
| WO | 2006057597 A1 | 6/2006 |

OTHER PUBLICATIONS

International Preliminary Report on Patentability for corresponding International Application PCT/SE2008/000203.
Supplementary European Search Report for corresponding European App. EP 08 72 4132.

* cited by examiner

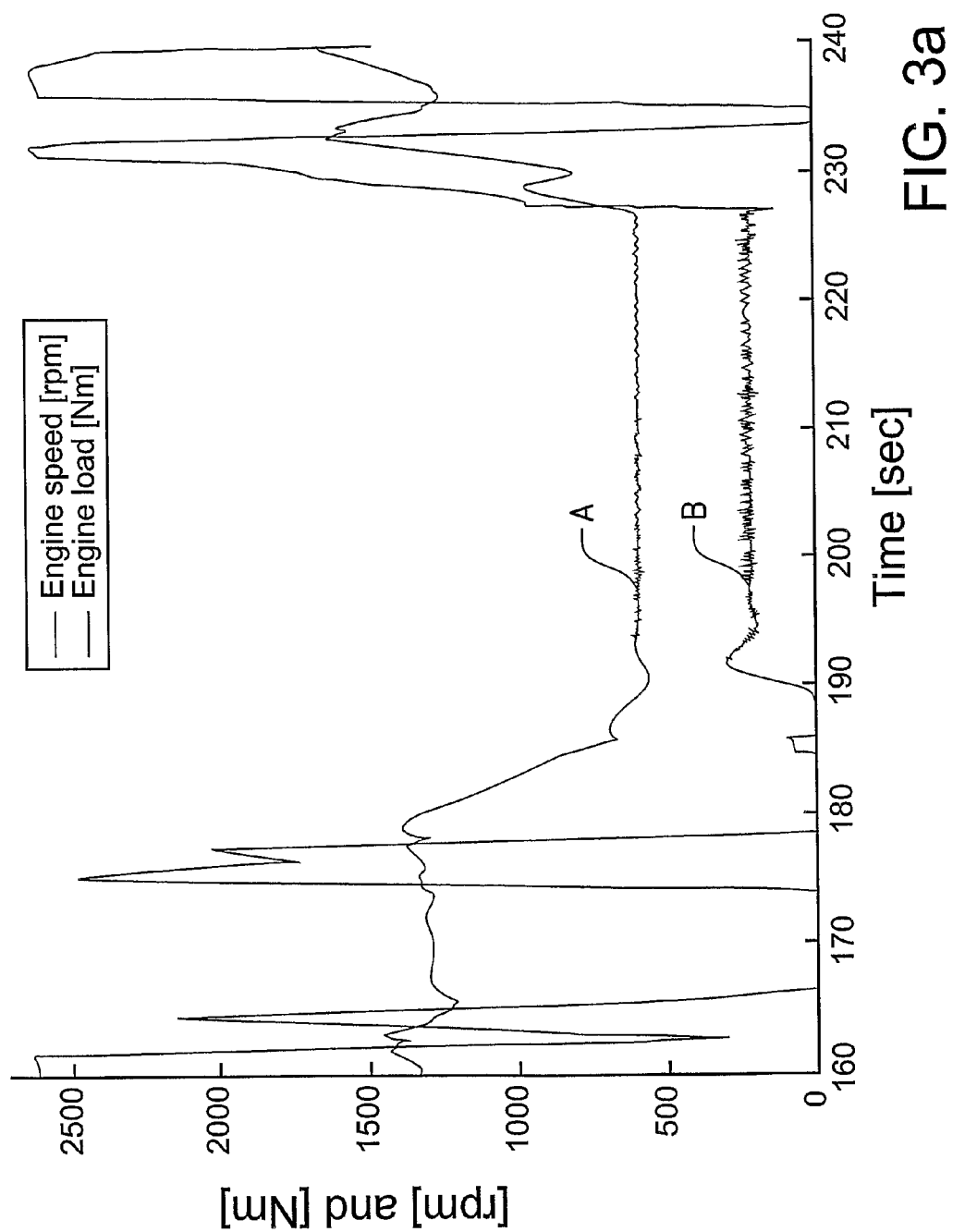

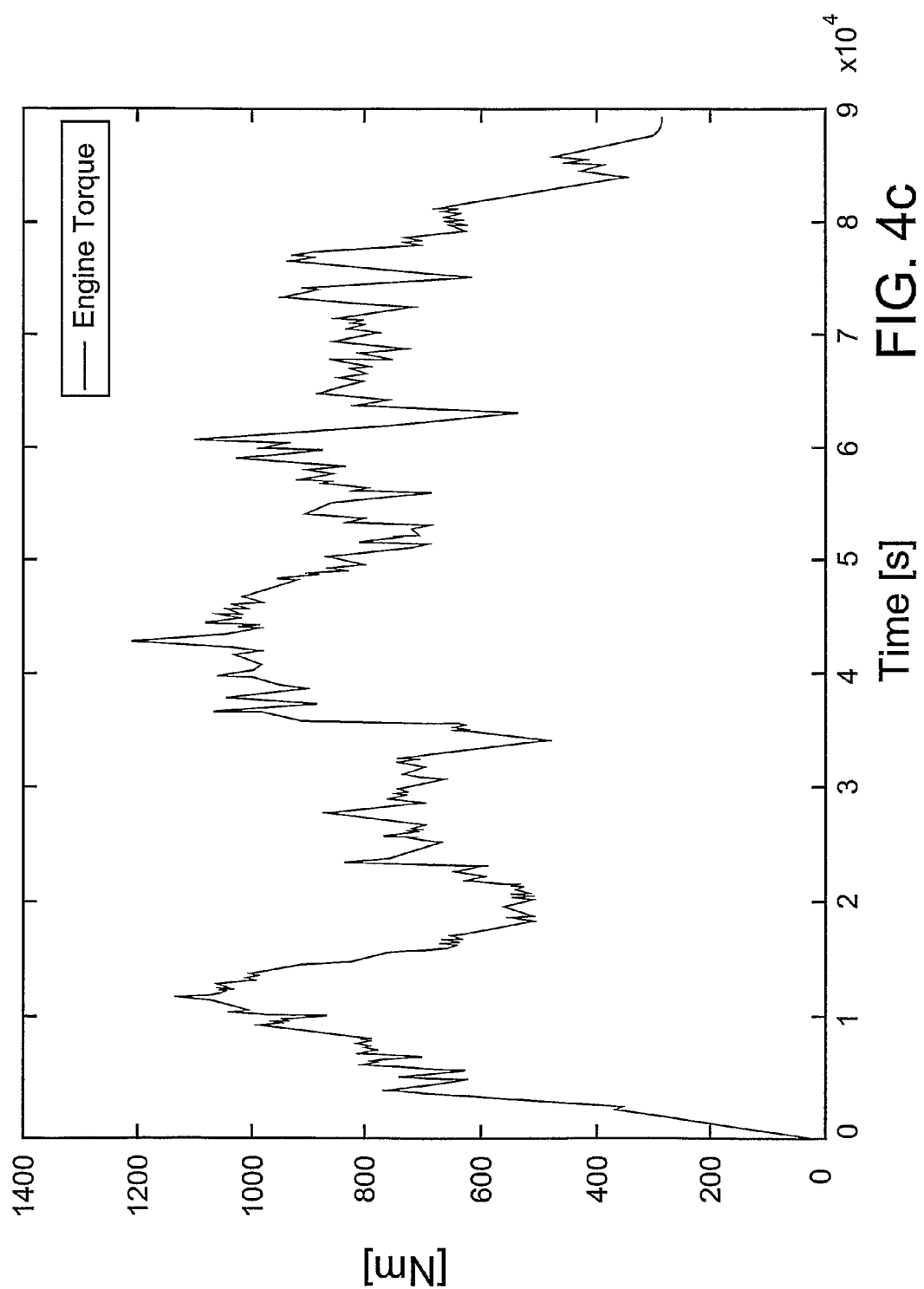

METHOD FOR FUNCTIONAL DIAGNOSIS OF A SEPARATOR

BACKGROUND AND SUMMARY

The present invention relates to a method for functional diagnosis of a separator for separating oil present in a blow-by gas flow from a crankcase in a combustion engine. The combustion engine is preferably used in a vehicle.

In the field of vehicle exhaust gas cleaning, the industry faces the delicate balance of providing an adequate effect from the engine, which is demanded by some consumers, while not emitting high quantities of harmful emissions, such as NOx, COx, hydrocarbons, particulates and the like, which is demanded by consumers and the manufacturer's own environmental policies. The demand to have a combustion engine and an exhaust gas cleaning system which strives towards zero emission is however not only driven by the consumers but also by the legislators. Hence an increased awareness of the need for environmental-friendly solutions in the vehicle industry is crystallized in a more restrictive legislation with respect to permitted emissions. An example of such legislation is the need for on-board diagnostics (OBD), although not implemented around the world yet. These restrictions provide new challenges and opportunities to the vehicle industry.

In short, some legislation in some countries demands that the on-board diagnosis system should detect any part of the system which is not functioning properly, is disconnected or not connected properly after e.g. service. This imparts a need for providing a number of sensors to different parts of the combustion engine, the vehicle and the on-board computer system. This results in a steadily increasing number of sensors and a more complex analysis methodology which requires more and more processing power from the on board computer system.

In patent EP 1,085,945 B1 a method for cleaning gases is disclosed. The patent discloses a separator with a plurality of rotating discs driven by pressurized air, pressurized lubricating oil, pressurized cooling water or pressurized fuel. The patent is however silent about how to perform any kind of quality control of the separator. The patent publication US 2001/0047801 discloses a method for performing a functional diagnosis, i.e. a functionality evaluation test, on a ventilation system of a crankcase of an internal combustion engine. The system comprises a pulse valve which is controlled as a function of the pressure in the crankcase, the pressure is determined using a pressure sensor. When a high pressure is detected, the pulse valve is opened to permit the exhaust gas to be discharged via an intake pipe. Based on the pressure characteristics it can be detected for example whether the oil level is sufficient, if there is a leak in the ventilation system or whether the internal combustion engine exhibits increased wear. The document is however silent about how to perform any functional diagnosis on a separator for separating oil from a gas. Hence it would seem that there is a need for a method for performing a functional diagnosis on a separator to meet the increasing demands from consumers, legislators as well as the manufacturers own environmental policy.

The above mentioned drawbacks are at least partly solved by means of a method for functional diagnosis of a separator, the separator being arranged to separate oil present in a blow-by gas from a crankcase in a combustion engine. The crankcase comprises a crankcase pressure sensor, and is in fluid communication with the separator. The method comprises the steps; detecting a first output signal of the crankcase pressure sensor at a first operational point or interval; comparing the first output signal of the crankcase pressure sensor with at least one reference value or signal; wherein the comparison between the first output signal of the crankcase pressure sensor and the at least one reference value or signal provides the functional diagnosis of the separator. The method according to the present invention provides for a functional diagnosis of a separator without the addition of extra sensors, instead existing sensors are better utilized. By using existing sensors already arranged in the combustion engine, in this case the crankcase pressure sensor, fewer manufacturing steps are needed when manufacturing the engine, cost is reduced and emissions dangerous to the environment are more efficiently controlled.

The at least one reference value or signal can be representative of a crankcase pressure derived at a second operational point or interval or optionally be a second output signal of the crankcase pressure sensor at a second operational point or interval. This latter embodiment of the present invention provides for a dynamic comparison between the first registered signal and the reference signal, as both of them are registered during the run of the combustion engine. During detection of the first output signal of the crankcase pressure sensor, the combustion engine is preferably run at a substantially constant engine speed or engine torque, preferably at idle. Optionally the at least one reference value or signal is derived from the output signal of the crankcase pressure sensor when the combustion engine runs in a working mode. By the term working mode is hereby meant when the engine is subjected to torque, i.e. when driving forward or backward.

A first average value over an operational interval can be determined from the output signal of the crankcase pressure sensor; the first average value is then compared with the at least one reference value or signal. This provides for a more secure and predictable comparison since a more reliable value is obtained from the measurement. Likewise an average of the at least one reference value can be determined over an operational interval; the first average value is then compared the average reference value. The average reference value is in an embodiment of the present invention equivalent with substantially the lowest value of the output signal of the crankcase pressure sensor. The operational interval can be within the time interval of 5-240 seconds, preferably 5-60 seconds, to provide an accurate measurement.

In an embodiment of the present invention, a response action is initiated as a consequence of the outcome of the functional diagnosis. Preferably, if the difference between the output signal and the at least one reference value or signal does not exceed a predetermined threshold value, a response action is initiated.

In one embodiment of the present invention the first output signal of the crankcase pressure sensor is accepted as a first output signal, with respect to the functional diagnosis, if the received numbers of measured data points exhibit an individual deviation of about maximum 10%, with respect to each other. As an alternative, the first output signal can be accepted as a first output signal, with respect to the functional diagnosis, when a substantially constant pressure (or delta pressure) is detected over a specified period of time. This acceptance step ensures that the registered pressure signal is collected at a point or in an interval in which the separator clearly has a proper function. For the purpose of the above, a first operational point or interval may comprise a continuously received number of measured data points.

The above mentioned reference points have been measured dynamically, i.e. during the run of the combustion engine, however, the at least one reference value can be a predetermined reference value. As such the predetermined reference value can be selected to represent different separators with different degree of malfunction. For instance the predetermined reference value can be representative of a separator having a grade of efficiency of less than 50% of a separator during otherwise normal operations. With the term "during otherwise normal operations" means in this context a separator with a reduced efficiency, i.e. with a malfunction, compared with an identical separator without the malfunction but exposed to the same operational conditions.

In an embodiment of the present invention, the first output signal from the crankcase pressure sensor, and preferably the first average value, is compared with a first and a second reference value, interval or signal. The first reference value is a dynamic reference value and the second reference value is a predetermined reference value. Optionally both the first and the second reference value be dynamic or both may be predetermined.

To provide for accurate readings and better functional diagnosis, the output signal of the crankcase pressure sensor can be compared to an ambient pressure, the ambient pressure being the ambient air pressure around the combustion engine. This adaptation of the crankcase pressure removes the influence of the ambient air which can disturb the readings of the crankcase pressure, e.g. when driving on roads at high altitude above sea level.

As mentioned above the separator can have many different configurations. For the purpose of the present invention it is however preferred that the separator comprises an oil separation member, such as a rotating disc, rotatably arranged in the separator. The oil separation member can be rotated by rotating means such as a turbine drive connector driven by main galley engine oil, cooling liquid, pressurized air, lubricating crankcase oil or the like, or optionally driven directly by an electrical motor or by a fan belt or the like.

The reference value or signal can be a second output signal of said crankcase pressure sensor at a second operational point or interval. While a change in the energy input of the rotary means and thereby the efficiency of the separator has been made between the first and said second output signal. This change in energy input, e.g. by changing the pressure of a pressurized fluid when the rotating member is driven by a pressurized fluid, the functional diagnosis of the separator can be further improved as a determined increase in energy input should cause a corresponding increase in pressure.

The present invention also relates to the use of a crankcase pressure sensor for functional diagnosis of a separator, the separator is a separator for separating oil present in a blow-by gas from a crankcase in a combustion engine.

The present invention also relates to a method for functional diagnosis of a separator for separating oil present in a blow-by gas flow from a crankcase in a combustion engine. The crankcase comprises a crankcase pressure sensor, and is in fluid communication with the separator, the separator comprises a blow-by gas inlet- and outlet openings. The method comprises the steps of; detecting an ambient temperature, the ambient temperature being the temperature around the combustion engine; detecting the blow-by gas temperature at the outlet opening of the separator or downstream of the outlet opening; comparing the ambient temperature with the blow-by gas temperature, wherein the detected relation between the ambient temperature and the blow-by gas temperature provides the functional diagnosis of the separator. Preferably is the blow-by gas temperature detected at the outlet opening of the separator. The ambient temperature and the blow-by gas temperature is preferably detected at a first operational point and thereafter compared to an ambient temperature and a blow-by gas temperature detected at a second operational point. The ambient temperature(s) and the blow-by gas temperature(s) can further be compared with the engine speed. The engine speed is detected at the same operational point(s) in time as the ambient temperature(s) and the blow-by gas temperature(s).

By the term "operational point" is meant a point when the system is running, preferably at a point in time.

BRIEF DESCRIPTION OF THE DRAWINGS

The present invention will be described in greater detail with reference to the accompanying figures wherein;

FIGS. 3a-3c shows the delta pressure as a function of time registered with a crankcase pressure sensor.

FIGS. 4a-4c illustrates separator temperature; engine speed and engine torque as a function of time respectively.

DETAILED DESCRIPTION

Figure 1:
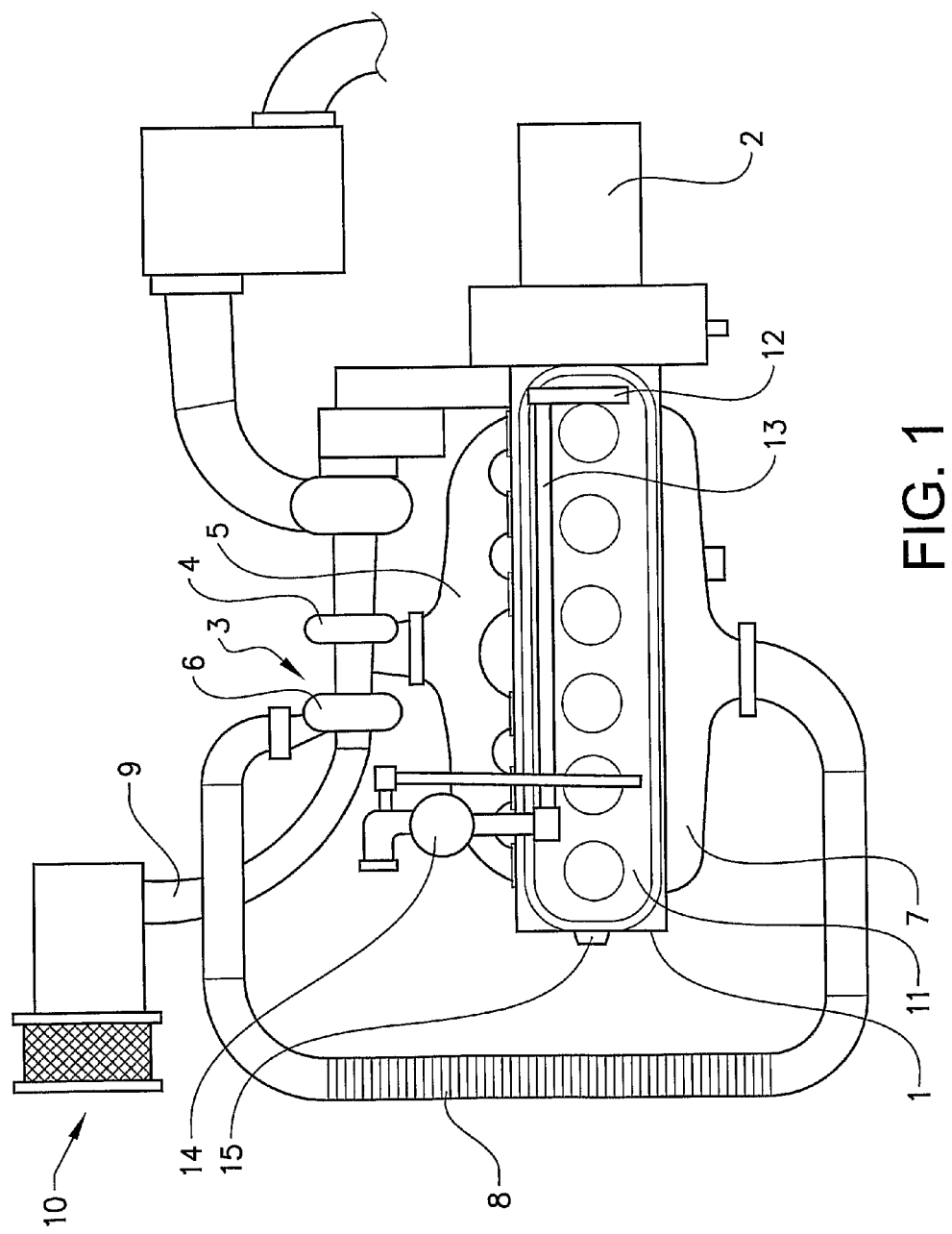
FIG. 1 shows a schematic overview of a combustion engine equipped with a separator to separate oil from a gas.

FIG. 1 shows a schematic overview of parts of a combustion engine. As will be described hereafter in a non limiting example, the present invention will be described in connection with an engine block 1 in a six-cylinder, four-stroke, diesel engine with a gear box 2 and a clutch that is connected to the engine's crankshaft. The engine is overloaded by means of a turbo compressor 3 of known type, which in turn comprises a turbine 4 connected to the engine's exhaust manifold 5 and a compressor 6 connected to the engine's induction (air intake) manifold 7 via an intercooler 8. By way of a suction pipe 9, the suction side of the compressor 6 is connected to an air filter 10.

Crankcase blow-by gases are generated in the engine and will be guided from the respective combustion chamber of the engine and into its crankcase 11, which contains lubricating oil. This takes place mainly as a consequence of non-sealed piston rings between the engine's pistons and the walls in the respective cylinders. Crankcase blow-by gases contain small particles in the form of oil drops, and for reasons which have been mentioned above; there is a demand for separating these particles from the gases. To this end, the engine's crankcase 11 comprises a generally known screen separator 12 and a baffle separator 13. From the baffle separator 13, the crankcase gases are guided further into a separator 14. Connected to the separator 14 is an oil sump via a drainage for draining the oil particles which have been separated by means of the separation devices, so that the oil particles are guided back to the oil sump. The oil is thereafter guided back to the crankcase 11. A crankcase pressure sensor 15 is arranged to the crankcase 11 to detect the pressure inside the crankcase 11.

For the purpose of describing the present invention, the separator 14 can be a conventional separator e.g. as described in the publication of EP 1,085,945 B1. The separator 14 comprises, in the described embodiment of the present invention, a plurality of rotating discs which during rotation will separate the oil droplets from the blow-by gas by means of the imparted centrifugal force. The separator 14 is oil driven by means of circulating main galley engine oil, pressurized by means of a pump, to circulate throughout different places in need of lubricating oil, in the combustion engine. The separator 14 will be described in greater detail with reference to FIG. 2.

Figure 2:
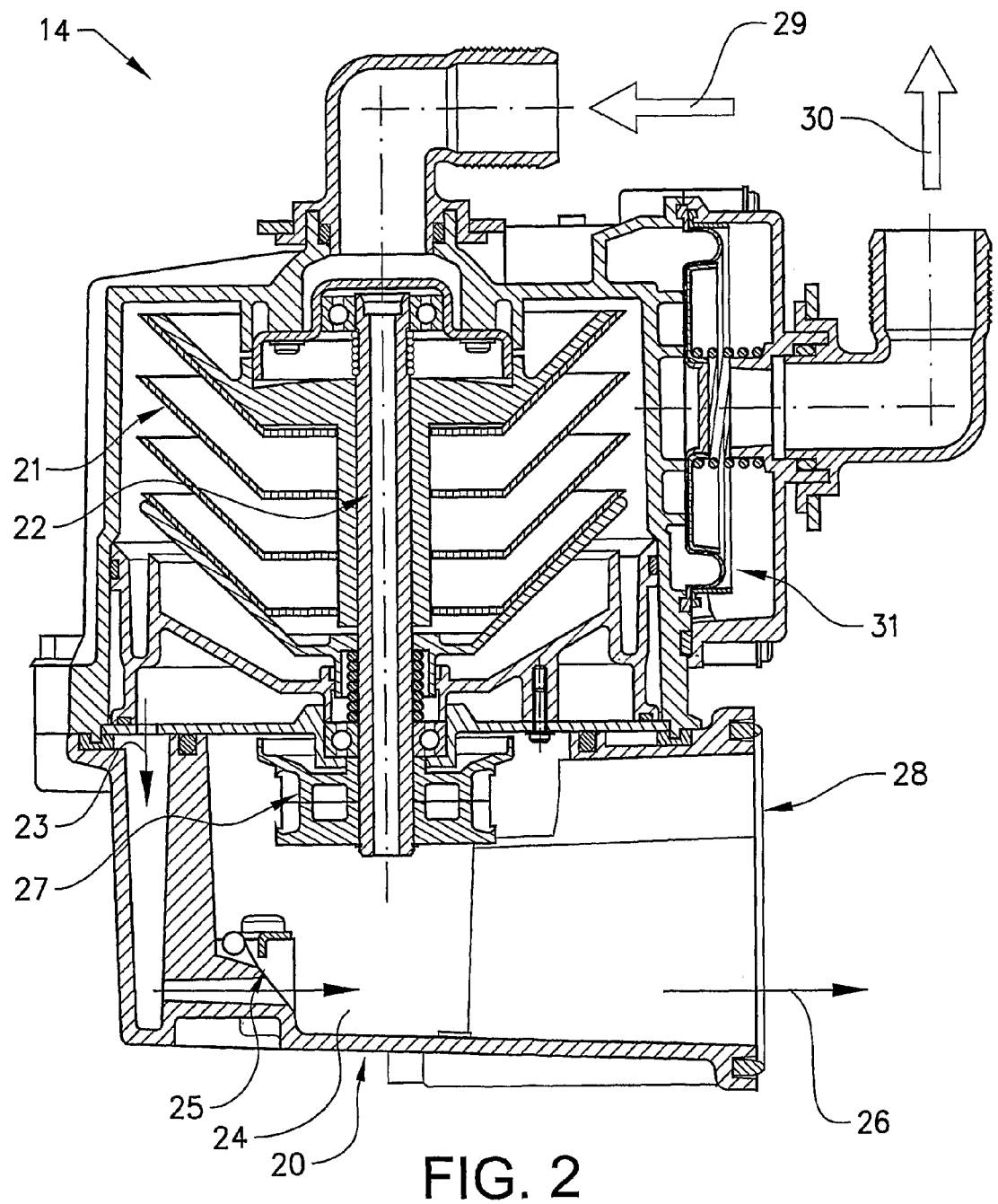
FIG. 2 shows a cross section of a separator which is used according to one embodiment of the present invention.

FIG. 2 shows a cross section of the separator 14 which can be utilized according to the present invention. The separator 14 comprises a housing 20 in which a plurality of rotating discs 21 are arranged, each disc rotates around a rotating axis 22. As the gas passes the rotating disc (after being led into the separator 14), the oil droplets are imparted with a centrifugal force which throws the oil droplets towards the inner surface of the housing 20, at which the oil droplets are free to flow along the inner surface of the housing 20 towards drainage 23. The drainage 23 drains the housing 20 from the separated oil droplets to an oil sump 24 via a check valve 25. The drained and separated oil can thereafter be guided back to the crankcase 11 via a crankcase conducting line 26. The rotating discs are rotated by means of a drive turbine 27 which is fed with main galley engine oil via a turbine drive oil connection 28, which in this embodiment of the present invention, is in fluid communication with the crankcase 11. The housing 20 is further provided with an inlet opening through which the unclean crankcase blow-by gas enters the housing 20 and an outlet opening 30 through which the cleaned gas exist the separator. A pressure regulator 31 provides for pressure control to the housing 20 and the exiting gas.

The present invention relates to a method for performing functional diagnosis of a separator for separating oil present in a blow-by gas flow from a crankcase in a combustion engine. The present invention will hereafter be described with reference to the above described engine block 1, crankcase 11 and separator 14, in a non-limiting way.

In order to illustrate the method for the functional diagnosis of a separator according to the present invention, the operation of a combustion engine and a separator 14 is documented and shown in FIG. 3. Different parameters were registered when running simulating a drive with the combustion engine in a laboratory. The combustion engine was provided with a brake device which, when controlled, can aid to simulate different driving situations such as an uphill or a downhill, etc. This can be combined with e.g. a quick acceleration, slow retardation, etc, dependent on which situation needs to be evaluated. Existing sensors on the combustion engine are connected to a computer with appropriate software installed to register the output signals from the sensors. The above described test rig is in itself conventional and will therefore not be described further.

Figure 3B:
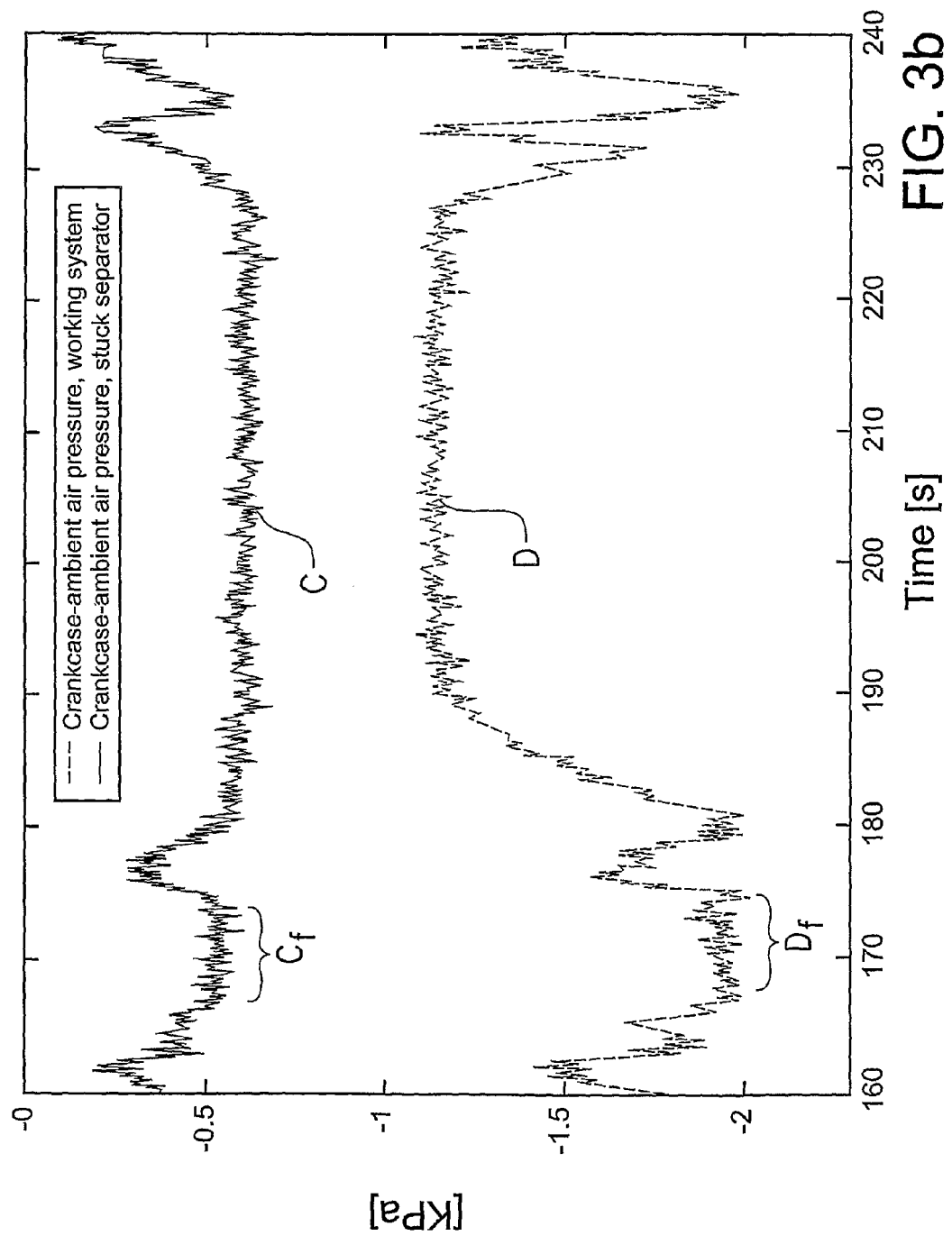
Figure 3C:
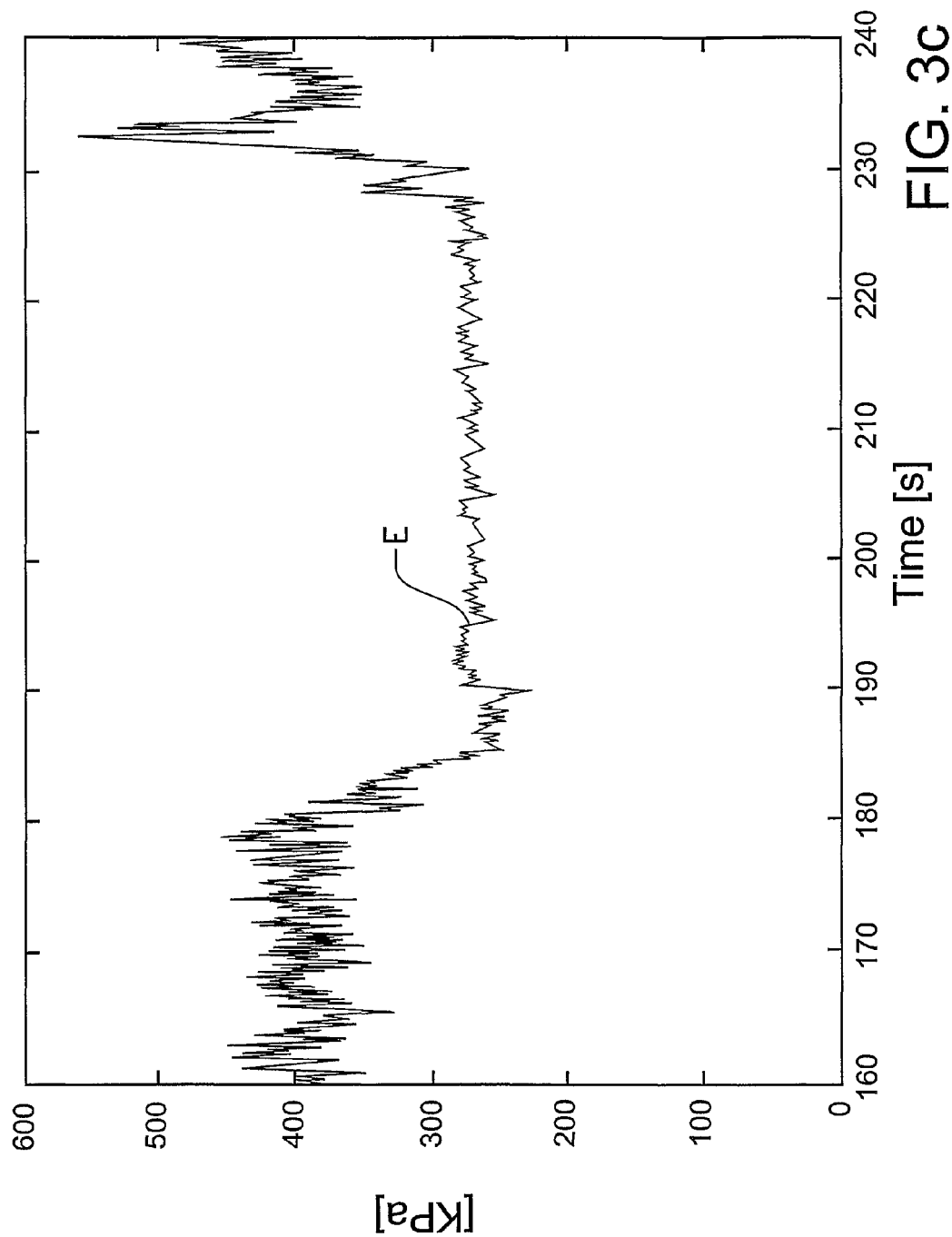

Test results from the above mentioned rig are illustrated in FIGS. 3a-3c which show three different diagrams with five different graphs in total. FIG. 3a shows; a first graph A, which shows the engine speed in revs/min (rpm) as a function of time; a second graph B, which shows the engine torque in Nm as a function of time. FIG. 3b shows; a third graph C which shows the crankcase pressure—the ambient air pressure as a function of time and with a malfunctioning separator; a fourth graph D, which shows the crankcase pressure—the ambient air pressure as a function of time and with a functional separator during normal operation. FIG. 3c shows a fifth graph E, which shows the main galley engine oil pressure as a function of time.

It should be noted that while the third graph C and the fourth graph D, in FIG. 3b, are registered data from two different runs with two different conditions set in the separator 14. The first graph A, the second graph B and the fifth graph E are identical independently of these two runs, i.e. whether the separator is malfunctioning or not. Hence these graphs remain the same and can be used to interpret the system independently of the condition set to the separator.

The graphs showed in FIG. 3a-3c show only parts of a full test run. As can be seen, the graphs start at time 150, which is representative for a test run after 150 seconds, and end at about 270 seconds. As can be seen, graph B in FIG. 3a, which is the engine torque, shows several peaks in the time interval 150-180 seconds which indicate that the engine is working with several torque peaks separated by torque valleys. The torque valleys e.g. simulate pressing down the clutch of the engine to change gear, and thereafter release of the clutch to provide gas to the engine. Between about 165-173 seconds substantially no torque is detected at all, which would simulate the engine running in a downhill situation with no gas provided, a situation also known as engine-braking. Between about 190-228 seconds all five graphs show respectively a substantially horizontal section. As can be seen the first graph A in FIG. 3a, which is the engine speed, shows constant low speed, and the second graph B shows constant low torque. This situation represents e.g. a stop due to a red light, at which the engine runs at idle. The section at which the engine runs at idle has a shorter preceding section of about 10 seconds at which the engine speed decreases. From about 230 seconds and above, the engine again runs to simulate driving on a country road or similar.

As mentioned, the third graph C in FIG. 3b shows a malfunctioning separator. The separator has been imparted with a defect to prevent the rotating discs 21 rotating. While the fourth graph D illustrates a fully-functional normal separator during normal operation. The signal illustrated in the third graph C and the fourth graph D is the measured pressure inside the crankcase 11 with a crankcase pressure sensor but with the ambient air pressure subtracted from the crankcase pressure. By subtracting the ambient air pressure, the system compensates for differences in ambient air pressure which would arise when e.g. driving on an altitude above, or high above, sea level. Ambient air pressure differences would otherwise complicate (but not prevent) the systems capability to detect changes in the crankcase pressure. As is understood when analysing the third graph C and the fourth graph D, the functional separator used in this evaluation provides for an under-pressure in the crankcase during normal operation. This under pressure is more easily detected by the eye when looking at the section when the engine runs at idle, i.e. in the time interval of 190-228 seconds and the preceding transition period of about ten seconds during which the engine speed decreases.

For instance, FIG. 3b and the fourth graph D are referred to. At about 180 seconds, the delta pressure (of the crankcase pressure and the ambient air pressure) is about −1.9 kPa. Because of the constant ambient air pressure the engine is exposed to, the delta pressure decreases as the engine strives towards the equilibrium when the engine runs at idle, to a level of about −1.2 kPa at 190 seconds. Hence the under-pressure in the crankcase has been reduced when the engine run at idle as compared when the engine runs with a higher speed and a lower torque. The effect of the under-pressure is a consequence of how the separator is connected to the crankcase; there might as well be an over-pressure dependent on how the separator is connected to the crankcase. The fifth graph E in FIG. 3c, shows the main galley oil pressure which drives the turbine drive connector 27 of the separator 14, as can be seen the crankcase pressure is a function of the main galley oil pressure. The conclusion from the above is that the output signal of the crankcase pressure sensor can be indirect proportional to the rotational velocity of the rotating discs and thereby the efficiency of the separator.

Once the above has been identified, the inventors have found several different ways of performing the functional diagnosis of the separator. Some of these ways will be described by means of the following non limiting examples.

Example 1

While the engine runs at idle, i.e. with a low rpm and substantially no torque, the signal from the crankcase pressure sensor is registered at a first point or interval. In FIG. 3*b*, this registration would correspond to the time interval between 190-228 seconds or any point therein. The signal is thereafter compared to a reference signal, value or interval. From FIG. 3, this reference value is collected from region indicated Cf and Df for respective third graph C and fourth graph D. Note that the sections Cf and Df are very similar in terms of appearance, hence, the reference interval in this case is clearly independent of the functioning of the separator. The reference value from regions Cf and Df are substantially the maximum delta pressure, and is, in this shown example, continued for a period of time of about 10-20 seconds for the graph C and D. The difference between the registered signal and the reference signal is indicative of the status of the separator. For the third graph C and a malfunctioning separator (with discs which can not be rotated), the difference is substantially negligible, while for the fourth graph D, the difference is profound. Hence in cases where no difference, or a negligible difference, can be detected it can be concluded that the separator is not functioning properly.

Example 2

The same as in example 1 but with the difference that the reference is not dynamically provided for a stored reference on i.e. a storage unit connected to a control unit is used instead. The registered signal from the crankcase pressure sensor is then compared to the stored reference.

Example 3

The same as in example 1, in combination with a stored reference as in example 2.

Example 4

This method for a functional diagnosis of a separator uses the method of identifying a specific pattern of the pressure sensor signal (e.g. the third graph C or the fourth graph D). By specific pattern is meant a specified value per time unit sequence, in this example that is the reference. As can be seen in FIG. 3*b*, the fourth graph D in the time interval 180-190 seconds, the graph exhibits a distinct pattern. The distinct pattern is initially similar to a function $f(x)=\ln X+m$, which at a certain point abruptly transcends to a substantially horizontal line (in the time interval of 190-220), easily separable from the other distinct sharp peaks present in the graph. Although the mentioned ln function may not illustrate the section of the graph in the interval of 180-190 seconds to 100%, it is believed that it illustrates the graph sufficiently clear enough to separate the identified section with respect to the other parts of the fourth graph D. The method is then to register the crankcase pressure sensor signal and to identify a predetermined pressure per time unit sequence (or delta pressure per time unit sequence). If the predetermined pressure per time unit sequence is identified, that is a positive indication of that the separator is functioning properly. This example can be combined with any of examples 1, 2 or 3.

In a fifth alternative way, not illustrated by way of example, differences in amplitudes detected between a working system, graph D, and a malfunctioning system, graph C, may be used for functional diagnosis of the separator.

The method for functional diagnosis of a separator for separating oil present in a blow-by gas flow from a crankcase in a combustion engine can comprise the use of a speed sensor and further at least one temperature sensor. As mentioned above, when a separator which comprises rotating discs is used, the output signal of the crankcase pressure sensor can be indirect proportional to the rotational velocity of the rotating discs and thereby the efficiency of the separator. Hence in this sense, the crankcase pressure sensor can be used indirectly as a speed sensor of the rotating discs. At least one temperature sensor is arranged to measure the blow-by gas at the air intake of the separator. The temperature of the blow-by gas is thereafter compared with the temperature of the ambient air. By comparing the temperature of the blow-by gas with the ambient temperature it can be detected whether the connections are connected to the air intake and thereby a second functional diagnosis is achieved to confirm the function of the separator or whether there is a gas leakage. Hence the present invention also relates to a method for functional diagnosis of a separator for separating oil present in a blow-by gas flow from a crankcase in a combustion engine, by means of using a temperature sensor and to compare the temperature of the gas at the inlet opening of the separator with the ambient air temperature. The ambient temperature can be measured with e.g. the vehicles ordinary ambient temperature sensor.

Figure 4A:
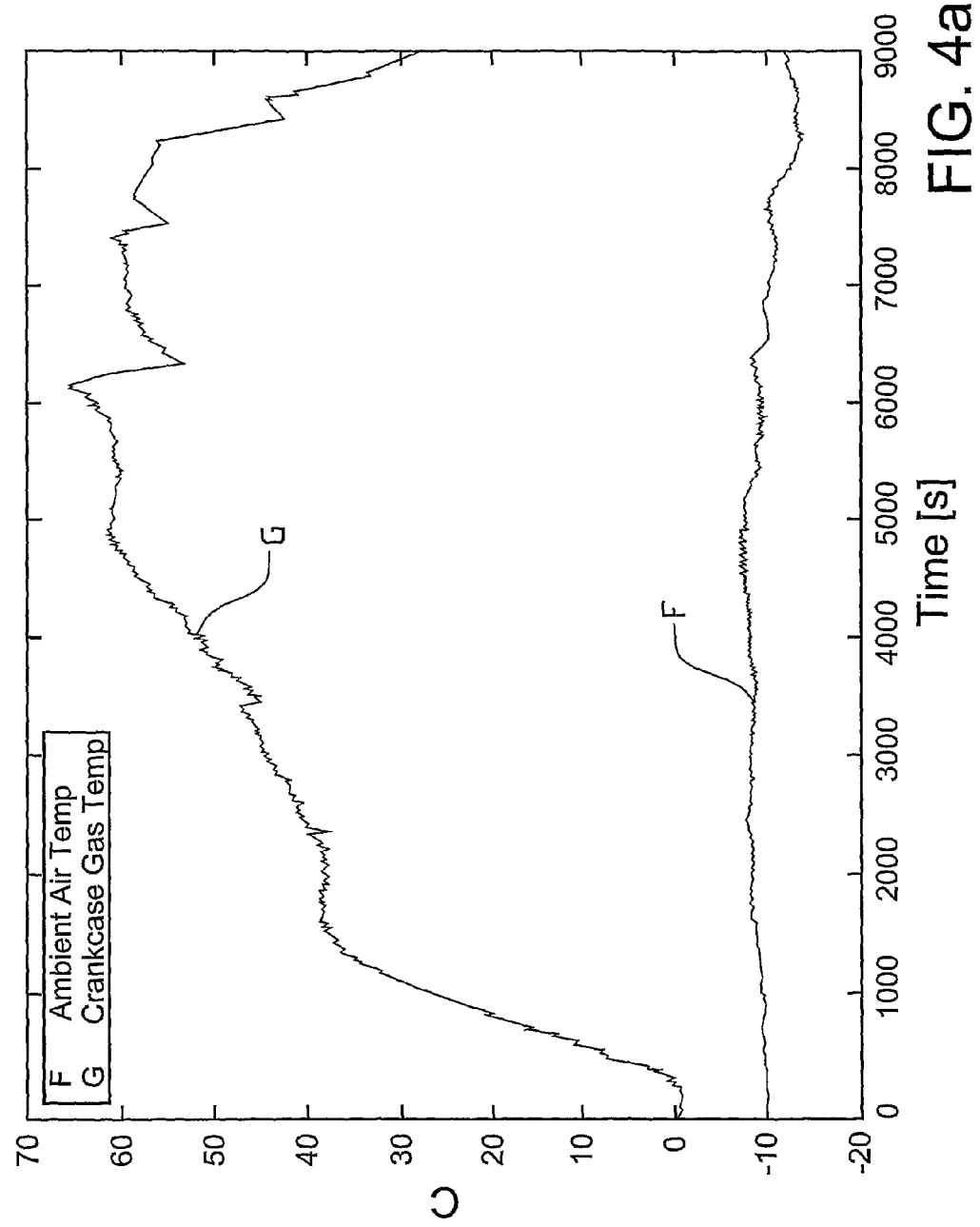
Figure 4B:
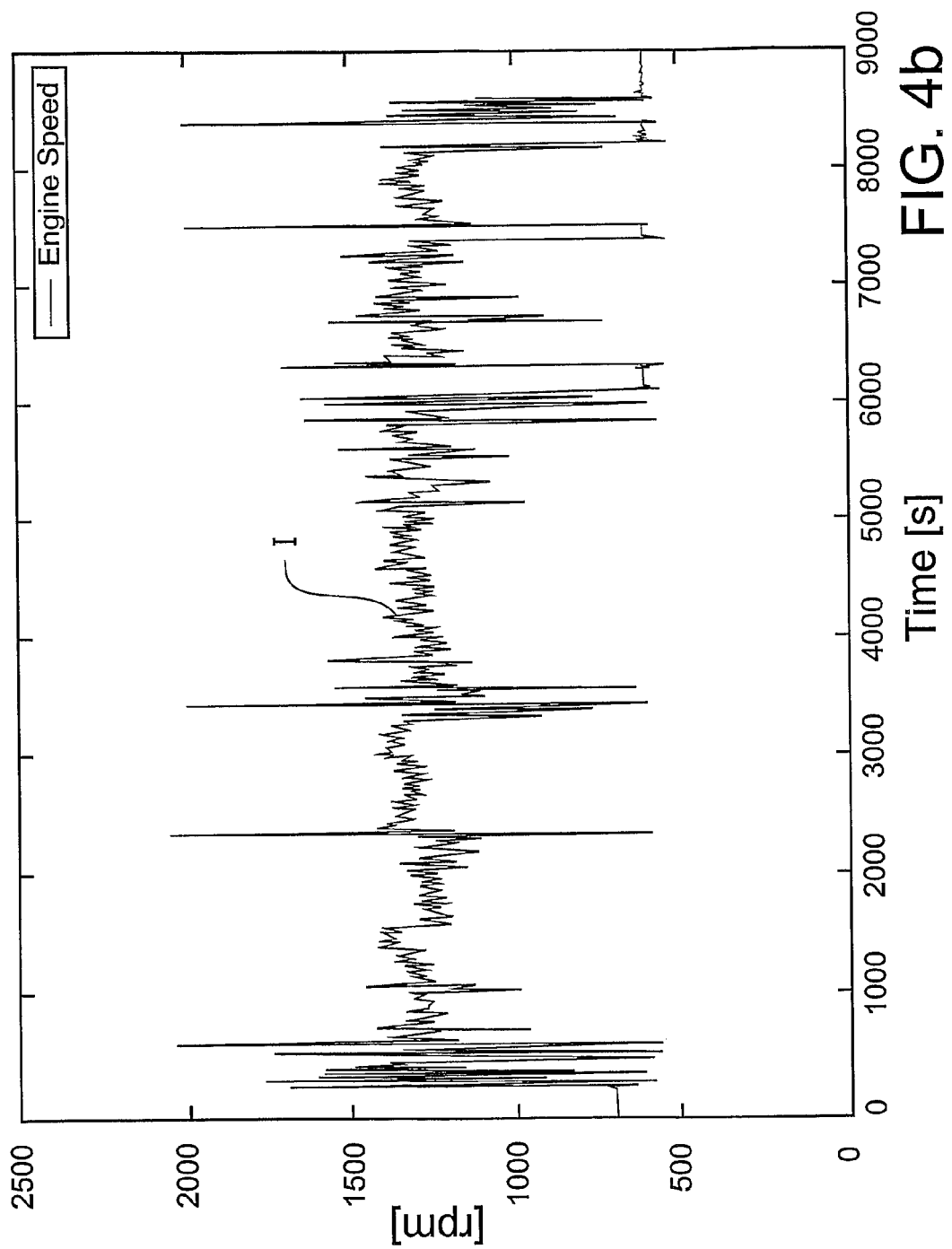

A separator to clean blow-by gases from crankcases, such as the separator described above, cleans the gas even when the discs are not turning, although to a less degree. In some cases a separator may remove as much as up to 70% of the oil in the blow-by gas when the discs are not turning. While the revs/minute easily can be registered when using e.g. an electric motor as driving unit to the discs, there may still be an air flow through the separator even when the blow-by gas from the crankcase is not directed properly into the separator. Flow sensors have thereby been shown to be less effective. Turning to FIG. 4*a*, FIG. 4*a* shows the temperature at the outlet opening of the separator as a function of time in the graph G and the ambient temperature as a function of time in the graph F. FIG. 4*b* shows the engine speed, graph I1 as a function of time. Graph F, G and I are logged during the same test cycle; hence the time scales are equivalent with each other in FIGS. 4*a* and 4*b*. FIG. 4*c* shows the engine torque as a function of time during the same test cycle.

As can be seen in FIGS. 4*a* and 4*b*, in the interval 0-360 seconds, the engine runs at idle. The engine speed is about 650 rpm within this interval. After about 360 seconds, the engine speed starts to fluctuate, but keeps an average of about 1200 rpm, while the blow-by gas temperature increases to a maximum of about 65 "C at about 6000 second. Hence the functionality of the separator can be evaluated by relating the blow-by gas temperature with the ambient temperature when the engine runs at idle and when the engine runs at an engine speed which is higher than idle, i.e. when the engine work.

The invention claimed is:

1. Method for functional diagnosis of a separator for separating oil present in a blow-by gas from a crankcase in a combustion engine, the separator comprising a plurality of rotating discs, the crankcase comprising a crankcase pressure sensor, and being in fluid communication with the separator, the method comprising:
   providing a first output signal of the crankcase pressure sensor, the first output signal being indirectly proportional to the rotational velocity of the rotating discs of the separator;
   detecting the first output signal of the crankcase pressure sensor at a first operational point or interval; and
   comparing the first output signal of the crankcase pressure sensor with at least one reference value or signal;
   diagnosing insufficient rotation of the rotating discs of the separator when a difference between the first output signal of the crankcase pressure sensor and the at least one reference value or signal identified through the comparison is below a difference for a properly functioning separator.

2. The method according to claim 1, wherein the at least one reference value or signal is representative of a crankcase pressure derived at a second operational point or interval.

3. The method according to claim 1, wherein the at least one reference value or signal is a second output signal of the crankcase pressure sensor at a second operational point or interval.

4. The method according to claim 1, wherein during detection of the first output signal of the crankcase pressure sensor, the combustion engine runs at a substantially constant engine speed of engine torque, preferably at idle.

5. The method according to claim 1, wherein the at least one reference value or signal is derived from the output signal of the crankcase pressure sensor when the combustion engine runs in a working mode.

6. The method according to claim 1, wherein the method further comprises
  determining a first average value over an operational interval from the output signal of the crankcase pressure sensor; and
  comparing the first average value with the at least one reference value or signal.

7. The method according to claim 6, wherein the method further comprises
  determining an average of the at least one reference value, at an operational interval; and
  comparing the first average value with the average reference value.

8. The method according to claim 7, wherein the average reference value is equivalent with substantially the maximum value of the output signal of the crankcase pressure sensor.

9. The method according to claim 6, wherein the operational interval is within the time interval of 5-240 seconds, preferably 5-60 seconds.

10. The method according to claim 1, wherein the method further comprises initiating a response action if the difference between the output signal and the at least one reference value or signal do not exceed a predetermined threshold value.

11. The method according to claim 1, wherein the first output signal of the crankcase pressure sensor at a first operational point or interval comprises a continuously received number of measured data points, wherein the method further comprises accepting the first output signal as a first output signal, with respect to the functional diagnosis, if the received number of measured data points exhibit an individual deviation of about maximum 10%, with respect to each other.

12. The method according to claim 1, wherein the at least one reference value is a predetermined reference value.

13. The method according to claim 12, wherein the predetermined reference value being representative of a separator having a grade of efficiency of less than 50% of a separator during otherwise normal operation.

14. The method according to claim 6, wherein the method further comprises comparing the first average value with a first and a second reference value, wherein the first reference value is derived when the combustion engine run during working mode, and the second reference value is a predetermined reference value.

15. The method according to claim 1, wherein the method further comprises comparing the output signal of the crankcase pressure sensor with an ambient pressure, the ambient pressure being the ambient air pressure around the combustion engine.

16. The method according to claim 1, wherein the separator comprises an oil separation member rotatably arranged in the separator, the oil separation member being rotated by rotating means.

17. The method according to claim 16, wherein the rotating means is a turbine drive connector driven by main galley engine oil, cooling liquid, pressurized air, electrical motor, or lubricating crankcase oil.

18. The method according to claim 16, wherein the reference value or signal is a second output signal of the crankcase pressure sensor at a second operational point or interval; the method further comprises;
  detecting the first output signal;
  changing the energy input to the rotating means and thereby the efficiency of the separator; and
  detecting the second output signal.

19. The method according to claim 1, wherein the first output signal of the crankcase pressure sensor indicates a rotational velocity of the rotating discs of the separator.

20. The method according to claim 1, comprising subtracting an ambient air pressure value from the crankcase pressure.

* * * * *